United States Patent
Carlson et al.

(10) Patent No.: US 8,819,419 B2
(45) Date of Patent: Aug. 26, 2014

(54) METHOD AND SYSTEM FOR DYNAMIC ENCRYPTION OF A URL

(75) Inventors: Michael Pierre Carlson, Austin, TX (US); Srinivas Chowdhury, Temple, TX (US)

(73) Assignee: International Business Machines Corporation, Armonk, NY (US)

( * ) Notice: Subject to any disclaimer, the term of this patent is extended or adjusted under 35 U.S.C. 154(b) by 3490 days.

(21) Appl. No.: 10/406,664

(22) Filed: Apr. 3, 2003

(65) Prior Publication Data

US 2004/0199762 A1 Oct. 7, 2004

(51) Int. Cl.
*H04L 29/06* (2006.01)

(52) U.S. Cl.
CPC .................. *H04L 63/0428* (2013.01)
USPC ........................................... 713/162

(58) Field of Classification Search
CPC ............... H04L 67/146; H04L 63/0428
USPC ....................................... 713/162
See application file for complete search history.

(56) References Cited

U.S. PATENT DOCUMENTS

| | | | |
|---|---|---|---|
| 6,169,805 B1 | 1/2001 | Dunn et al. | |
| 6,484,263 B1 | 11/2002 | Liu | |
| 6,970,849 B1 * | 11/2005 | DeMello et al. | 705/52 |
| 7,043,752 B2 * | 5/2006 | Royer et al. | 726/8 |
| 7,089,425 B2 * | 8/2006 | Chan | 713/189 |
| 2002/0032782 A1 | 3/2002 | Rangan et al. | |
| 2002/0094870 A1 * | 7/2002 | Murray | 463/42 |
| 2003/0037070 A1 * | 2/2003 | Marston | 707/200 |
| 2003/0037232 A1 * | 2/2003 | Bailiff | 713/153 |
| 2003/0163740 A1 * | 8/2003 | Thjai et al. | 713/202 |

OTHER PUBLICATIONS

Berners-Lee, Masinter and McCahill; Request for Comments: 1738; Uniform Resource Locators (URL); Dec. 1994; 25 pages.

* cited by examiner

*Primary Examiner* — Jacob Lipman
(74) *Attorney, Agent, or Firm* — Schmeiser, Olsen & Watts, LLP; Mark C. Vallone

(57) ABSTRACT

The present invention provides a dynamic, easily configurable system, which can be used to encrypt or otherwise hide the internal structure of a network. The present invention protects access to computing systems via a URL by encrypting all or a portion of the URL during the transmission of information over a network. Prior to the actual transmission of the information, fields in the URL can be encrypted using conventional encryption techniques. The encryption will occur after the destination has been determined such that the encryption will not cause the information to be misdirected to a wrong destination. At the destination location, there is first a determination that this URL is an encrypted URL. At this point, a decryption technique is employed based on the predetermined encryption scheme to decrypt the URL. The full URL is now accessed only by the destination location and is not accessible during travel over the network between the originating and destination locations.

19 Claims, 8 Drawing Sheets

METHOD AND SYSTEM FOR DYNAMIC ENCRYPTION OF A URL

FIELD OF THE INVENTION

The present invention provides a method and system for protecting computing devices, systems and networks from unauthorized access gained through the contents of messages transmitted across a computing network and in particular to a method and system for protecting computing systems from unauthorized access, gained through the contents of URLs, by dynamic encryption of URLs which are part of messages transmitted across a computing network.

BACKGROUND OF THE INVENTION

The Internet, which started in the late 1960s, is a vast computer network consisting of many smaller networks that span the entire globe. The Internet has grown exponentially, and millions of worldwide users ranging from individuals to corporations now use permanent and dial-up connections to access the Internet on a daily basis. The computers or networks of computers connected within the Internet, known as "hosts", allow public access to databases containing information in nearly every field of expertise and are supported by entities ranging from universities and government to many commercial organizations.

The information on the Internet is made available to the public through "servers". A server is a system running on an Internet host for making available files or documents contained within that host. Such files are typically stored on magnetic storage devices, such as tape drives or fixed disks, local to the host. An Internet server may distribute information to any computer that requests the files on a host. The computer making such a request is known as the "client", which may be an Internet-connected workstation, bulletin board system or home personal computer (PC).

The World-Wide Web (Web) is a method of accessing information on the Internet which allows a user to navigate the Internet resources intuitively, without IP addresses or other technical knowledge. The Web dispenses with command-line utilities which typically require a user to transmit sets of commands to communicate with an Internet server. Instead, the Web is made up of hundreds of thousands of interconnected "pages", or documents, which can be displayed on a computer monitor. The Web pages are provided by hosts running special servers. Software which runs these Web servers is relatively simple and is available on a wide range of computer platforms including PC's. Equally available is a form of client software, known as a Web "browser", which is used to display Web pages as well as traditional non-Web files on the client system. Today, the Internet hosts which provide Web servers are increasing at a rate of more than 300 per month Each Web page may contain pictures and sounds in addition to text. Hidden behind certain text, pictures or sounds are connections, known as "hypertext links" ("links"), to other pages within the same server or even on other computers within the Internet. For example, links may be visually displayed as words or phrases that may be underlined or displayed in a second color. Each link is directed to a web page by using a special name called a URL (Uniform Resource Locator). URLs enable a Web browser to go directly to any file held on any Web server. A user may also specify a known URL by writing it directly into the command line on a Web page to jump to another Web page.

A document designed to be accessed and read over the web is called a web page. Each web page must have an address in a recognized format—the URL, or Uniform Resource Locator—that enables computers all over the world to access it. Each web page has an unique URL. A web page typically contains both text and images. Because image files are large, even when compressed, it could take a long time to retrieve a web page, especially when a voice-quality phone line is used to connect to the Internet. Consequently, it is important to design a browser which is able to reduce the amount of time to display a web page.

As previously mentioned, a URL is a Uniform Resource Locator, a standard way developed to specify the location of a resource available electronically. URLs make it possible to direct both people and software applications to a variety of information, available from a number of different Internet protocols. Most commonly, a user will encounter URLs when using a World Wide Web (WWW) client, as that medium uses URLs to link WWW pages together. In a WWW browser's "location" box, the item that generally starts with "http:" is a URL. Files available over protocols besides HTTP, such as FTP and Gopher can be referenced by URLs. Even Telnet sessions to remote hosts on the Internet and someone's Internet e-mail address can be referred to by a URL.

A URL is like similar to a person's complete mailing address: it specifies all the information necessary for someone to address an envelope to you. However, they are much more than that, since URLs can refer to a variety of very different types of resources. A more fitting analogy would be a system for specifying a user's mailing address, the user's telephone number, or the location of a book a user has just read from the public library. All of this information would be in one format. URLs have a very specific syntax and all s follow the format.

The URL naming system consists of three parts: the transfer format, the host name of the machine that holds the file, and the path to the file. An example of a URL may be:

"http://" concatenated with "www.college.univ.edu/Adir/Bdir/Cdir/page.html", where "http" represents the transfer protocol; a colon and two forward slashes (://) are used to separate the transfer format from the host name; "www.college.univ.edu" is the host name in which "www" denotes that the file being requested is a Web page; "/Adir/Bdir/Cdir" is a set of directory names in a tree structure, or a path, on the host machine; and "page.html" is the file name with an indication that the file written in HTML. In short, a URL is a very convenient and succinct way to direct people and applications to a file or other electronic resource.

The Internet maintains an open structure in which exchanges of information are made cost-free without restriction. The free access format inherent to the Internet, however, presents difficulties for those information providers requiring control over their Internet servers. Consider for example, a research organization that may want to make certain technical information available on its Internet server to a large group of colleagues around the globe, but the information must be kept confidential. Without means for identifying each client, the organization would not be able to provide information on the network on a confidential or preferential basis. In another situation, a company may want to provide highly specific service tips over its Internet server only to customers having service contracts or accounts.

Access control by an Internet server is difficult for at least two reasons. First, when a client sends a request for a file on a remote Internet server, that message is routed or relayed by a web of computers connected through the Internet until it reaches its destination host. The client does not necessarily know how its message reaches the server. At the same time, the server makes responses without ever knowing exactly who the client is or what its IP address is. While the server may be programmed to trace its clients, the task of tracing is often difficult, if not impossible. Secondly, to prevent unwanted intrusion into private local area networks (LAN), system administrators implement various data-flow control mechanisms, such as the Internet "firewalls", within their networks. An Internet firewall allows a user to reach the Internet anonymously while preventing intruders of the outside world from accessing the user's LAN.

For various historical and technical reasons, internet URLs are designed in such a way that the directory structure of your web server is exposed to the outside world. This exposure allows hackers an inside look at your system. In many cases on a public web server you do not want this type of information exposed as it opens the door to possible intrusion.

It's considerably harder to configure servers to permit users to access appropriate resources without exposing the web-server to possible intrusions. Using an alias system can become very cumbersome and difficult to manage. Alternatively, trying to obscure information by creating a complicated layout of the files system can add to the problems of system management and content updates.

There are known weaknesses with many operating systems that allow shell meta-characters (*, & etc.,) to break the application, thereby exposing the web-server. It may sound far-fetched but it happens most of the times. Some of the conventional methods for transferring information via a computing network are defined as:

Get Method: Normally a URL string is used to pass information (parameters) from page to page. On the receiving end, the URL string is parsed and appropriate actions are taken. One way to pass the parameters is by method=get, with this method, the parameters are displayed in the URL e.g., "http://" concatenated with "www.ibm.com/gold/ParseForm?username=abc&password=abc123".

Post Method: Kind of hides. You can prevent sensitive information from being displayed in the URL by using method=instead of method=get. But to be precise Post does not hide information in the URL, it sends the information in the HTTP headers apart from the URL. It's still possible to intercept the headers.

SSL: In the case of Post method, the Post data is hidden from external users, but the action portion of the form is still visible. In the users browser, the POST data is available by viewing the source of the web page. In the case of the GET method, nothing is hidden but the contents of the web resources, i.e. the URL remains visible to all. While post and SSL hide information passed from page to page, they actually do-not encrypt the URL exposing the structure of the web-server.

Redirecting: Another possible solution would be to redirect to the requested resource. Again, while this could be useful, it would still allow users to view the URL.

Aliasing: Aliasing URL's to point to different directories can be useful in obscuring some amount of information about your web server, but aliasing only works to a point. Sub-directories would still be visible at lower levels and directory structures would still be exposed to external users. Aliasing also requires a large amount of manual configuration work. It is not easily reconfigured and additions are also time consuming and not dynamic.

Although these methods can adequately transmit information via a computing network, none these methods can adequately protect unauthorized access to messages involved in the transmission. In addition, even though network security schemes exist that can protect access to the contents of messages; it is believed that no current system attempts to protect access to the Universal Resource Locators (URLs) that are part of each message transmission. Access to the URLs can enable unauthorized persons to learn important information about the directory structures of resources on a network. This information could enable one to cause substantial harm to resources connected to the network and ultimately to the entire network. Therefore, there remains a need for a solution that provides a dynamic, easily configurable system, which can be used to encrypt or otherwise hide the internal structure of your web server. URLs can be changed without changes to the web server or to the file system of the web server.

SUMMARY OF THE INVENTION

It is an objective of the present invention to provide a method and system to protect access to a Universal Resource Locator (URL) during the transmission of information over a communication network.

It is a second objective of the present invention to provide a method and system for encrypting part or all of a URL during the transmission of information over a communication network.

It is a third objective of the present invention to provide a method and system to decrypt the encrypted portions of a URL after the transmitted information is received at a destination location.

It is a fourth objective of the present invention to determining whether to encrypt a particular URL prior to transmission of information over the communication network.

The present invention provides a dynamic, easily configurable system, which can be used to encrypt or otherwise hide the internal structure of a network device such as a web server. URLs can be changed without changes to the web server or to the file system of the web server. The present invention protects access to computing systems via a URL by encrypting all or a portion of the URL during the transmission of information over a network. Prior to the actual transmission of the information, fields in the URL can be encrypted using conventional encryption techniques. The encryption will occur after the destination has been determined such that the encryption will not cause the information to be misdirected to a wrong destination. At the destination location, there is first a determination that this URL is encrypted. At this point, a decryption technique is employed based on the encryption scheme to decrypt the URL. The full URL is now accessed only by the destination location and is not accessible during travel over the network between the originating and destination locations.

There are several advantages of using this invention. 1) The encryption of the URL hides the directory structure of the web-server; 2) The techniques of the present invention address the Cross Site Scripting security issue ("http://" concatenated with "www.cert.org/advisories/CA-2000-02.html"); and 3) The present invention allows dynamic URL modifications.

DETAILED DESCRIPTION OF THE INVENTION

Figure 1:
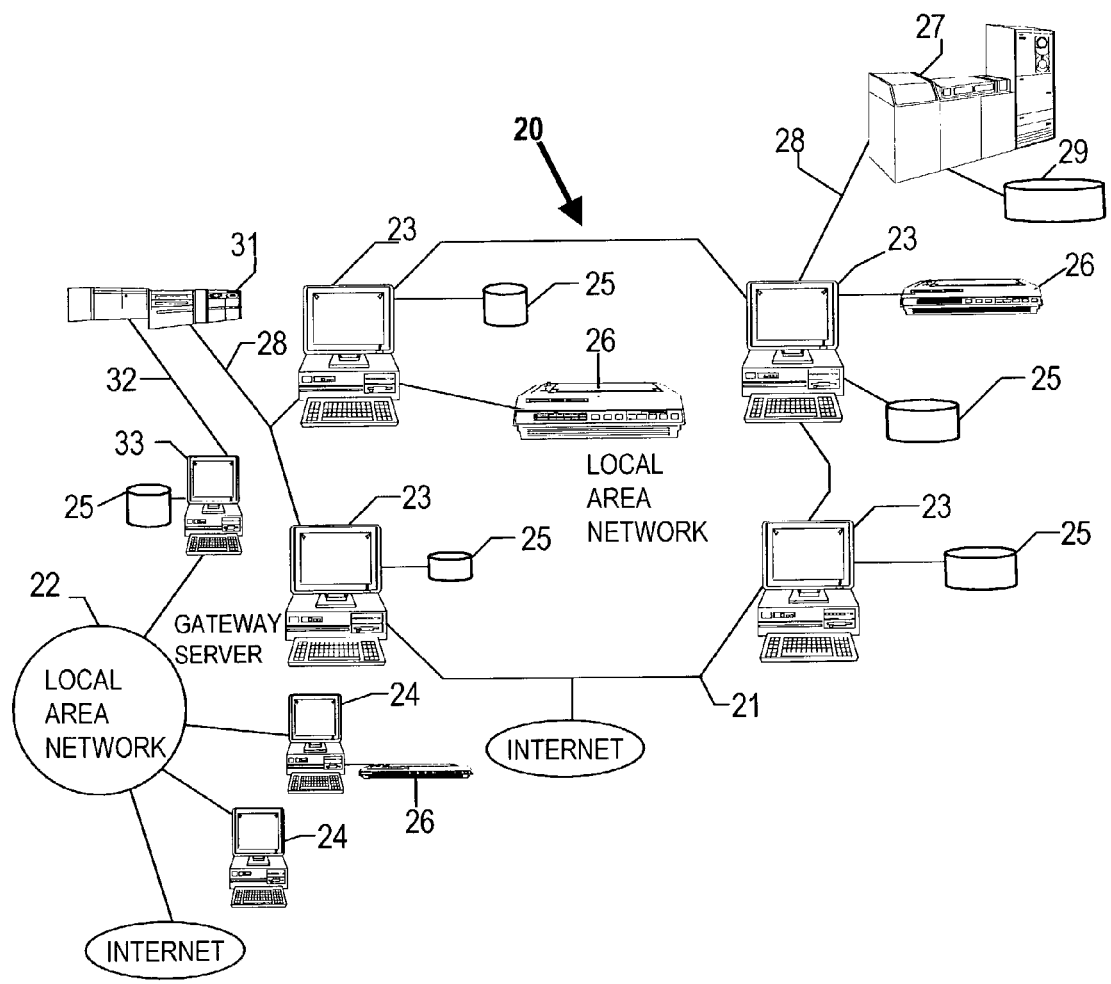
FIG. 1 is a diagram of a computer network over which messages may be transmitted between a user and the reservation center of the present invention.

The method of the present invention may be implemented in a global computer network environment such as the Internet. The system used to access and communicate via the computer network could be conventional computer terminal system comprised of a computer, and peripheral devices including a monitor, keyboard and mouse. With reference now FIG. 1, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Still referring to FIG. 1 it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS) which serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

Figure 2:
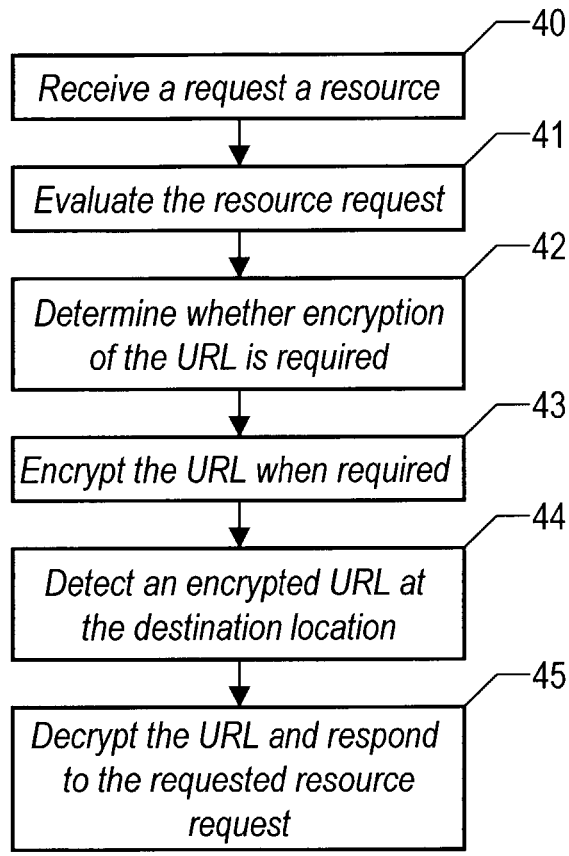
FIG. 2 is a flow diagram of the general concept and implementation for encrypting a Universal Resource Locator (URL) in accordance with the present invention.

FIG. 2 is a flow diagram of the general concept and implementation of the present invention. In step 40, a resource request is received from a user at a computer location. This request usually goes from the originating location to a web browser. At this point, step 41 evaluates the URL of the originating request to determine the location of the requested resource and any contents of the message. Based on information, which could include the location of the requested resource and the contents of the originating request message, step 42 determines whether the URL of the original resource request requires encryption prior to transmission of the request. The encryption analysis occurs after the determination of the destination location of the message so as to not misdirect the message during transmission. If the URL requires encryption, step 43 encrypts the URL. The encryption scheme can be a conventional scheme. The encryption of the URL could be a partial encryption or a total encryption. Once the message reaches the desired destination, step 44 detects that the URL is in an encrypted form and initiates a decryption technique based on the original encryption scheme in step 45. In the reply message to the original resource request, the same type of URL encryption occurs.

Figure 3:
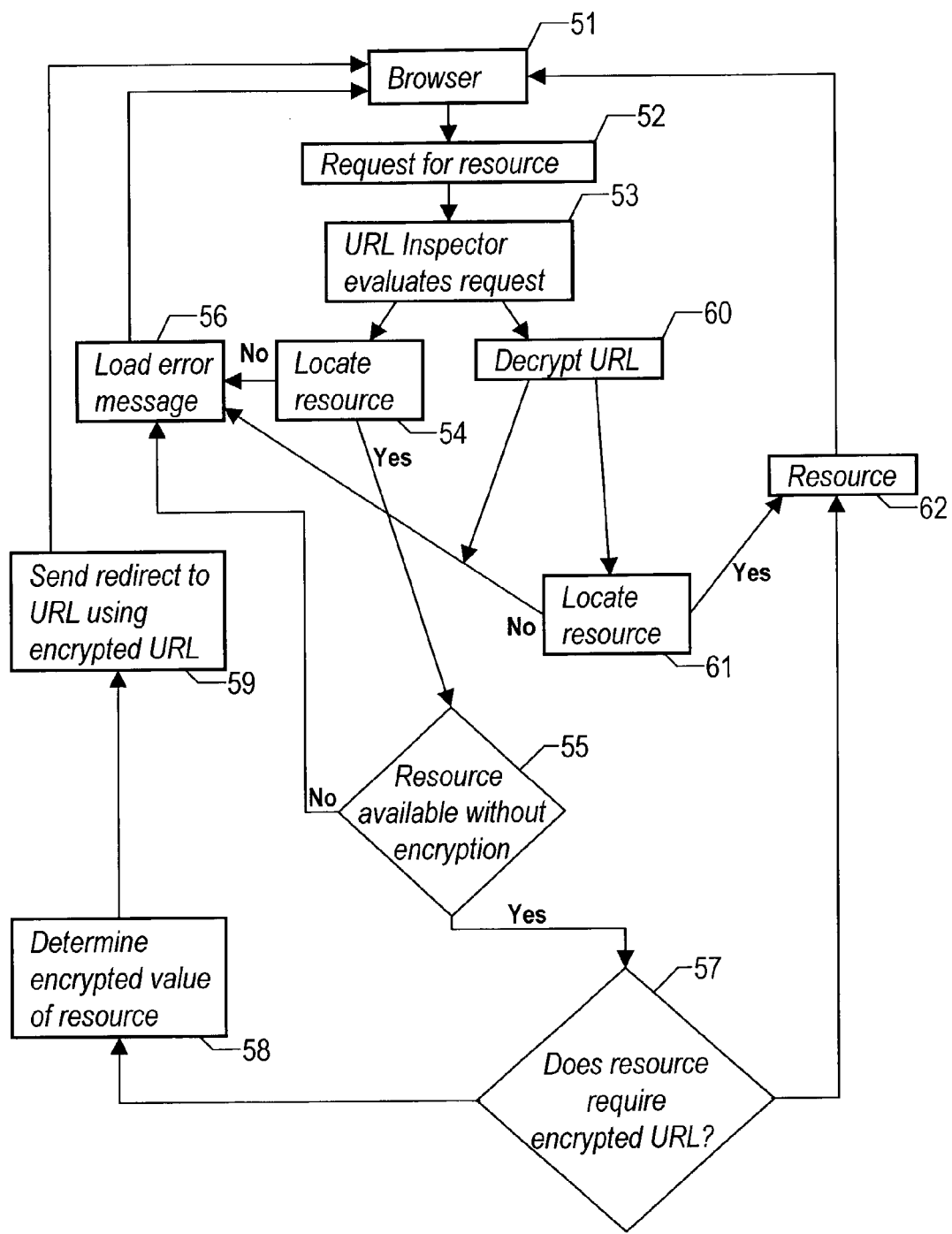
FIG. 3 is a detailed block and flow diagram illustrating the concept and implementation of the present invention.

FIG. 3 is a detailed block and flow diagram illustrating the concept and implementation of the present invention. In block 51, a user is viewing a page in a web browser containing one for more internet hyperlinks. When the user selects one of these links, the browser issues a request for the specified resource. At this point, in block 52, the user's browser issues an http (or ftp, gopher) style request using the GET or POST method. For purposes of this discussion the GET method will be used to issue the http. This request is sent across the network to an internet server. Block 53 incorporates a URL inspection technique on the server that evaluates the URI portion of the URL (i.e. the portion of the URL after the {schema}://{host}:{port} portion). In the evaluation, the URL inspector determines whether the request URL is a standard, plaint text URL or if it is an encrypted URL. If the determination is that the requested URI is plain text, the process moves to block 54. Otherwise, the process follows goes to step 60. In block 54, the step is to determine if the request for the resource, using a plain text using URL, is available on the system. If so, the system attempts to locate the resource in the same block 54. If the resource is located on the system, the process moves to block 55. If the resource was not found, the process moves to block 56. In the case of block 55, since this resource has been requested using a plain text URL, the system must determine if the resource is available without using an encrypted URL (i.e. just because it is there, it might not be accessible using a plain text URL). If the resource is not available without encryption, the process moves to block 56. If the resource is available without encryption, there must be a determination whether the resource URL requires encryption before returning the resource to the browser of the original requester. This process occurs in step 57. If the resource is to be returned without a URL change, then the process moved to step 62. The resource is returned to the requesting browser 51. Otherwise, if the URL must be encrypted, the process moves to step 58. In block 58, the encrypted URL value is calculated or determined (via database lookup, file lookup, etc.). Once the value is determined, the process moves to block 59. The new, encrypted URL is returned to the browser via a redirect procedure. This return of the URL will tell the browser to issue a new request using the new, encrypted URL. This URL return can alternatively be done by returning a page to the browser with a link to the resource using the new URL along with or without a message.

Referring to block 56, when the process reaches this point, an error has occurred at some point during the process. The error condition exist because the system has determined that the requested URL cannot be returned to the browser because: a) the resource is not available, b) the resource is truly not present (i.e. 404 type of error, from step 54 and step 61, c) the resource was requested via plain text and this is not allowed (from block 55) or d) because the encrypted URL could not be decrypted (from block 60).

Referring back to block 53, if the value is determined to be other than a plain text request, the process moves to block 60. At this point, the URL from the requester is decrypted and verified. If there is an error decrypting the URL or the encrypted URL is determined to be invalid, the process moves to step 56, otherwise the process moves to step 61. In step 61, the system attempts to locate the resource. If the resource is not found, the process moves to step 56. If the resource is located, the process moves to step 62. In step 62, the requested resource is returned to the user's browser.

Figure 4:
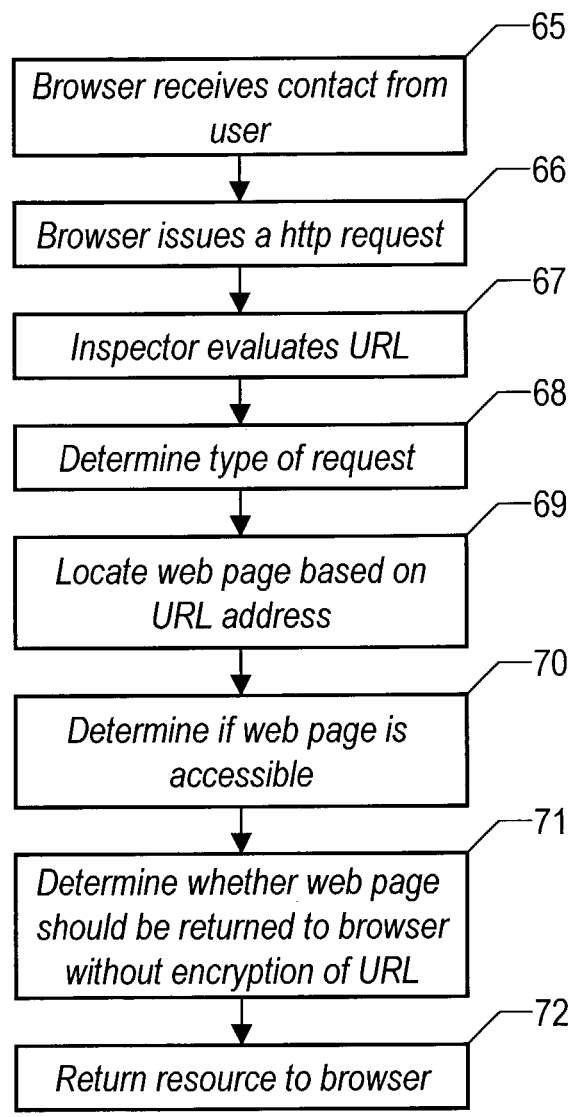
FIG. 4 is a flow diagram of the implement of the present invention when encryption of the URL is not necessary.

FIG. 4 is a flow diagram of the implementation of the present invention is in the conventional situation when it is not necessary to encrypt the URL. In this implementation, in step 65, the user's browser receives an access request from the user. This request contains a URL to a particular web location. For purposes of this example the URL is "http://" concatenated with "www.ibm.com/gold/Welcome". The browser in step 66 issues an http request based on this URL in the user's access request. The evaluation of this URL occurs in step 67. In this evaluation, there is an inspection of the "/gold/Welcome" portion of URL. This portion of the URL is the specific location in the directory. The inspection of the URL resulted in a determined that the request was a plain text request, step 68. After a determination that the request was a plain text request, step 69 locates the '/gold/Welcome' page. Once the page is located, step 70 determines whether the page is accessible. If the page is accessible, there is a determination whether this page should be returned to browser in an encrypted form, step 71. This determination can be based on the security policy established for that system. In this example, the determination is that the page should be returned without encryption. Step 72 returns this page to the browser as requested by the user.

Figure 5:
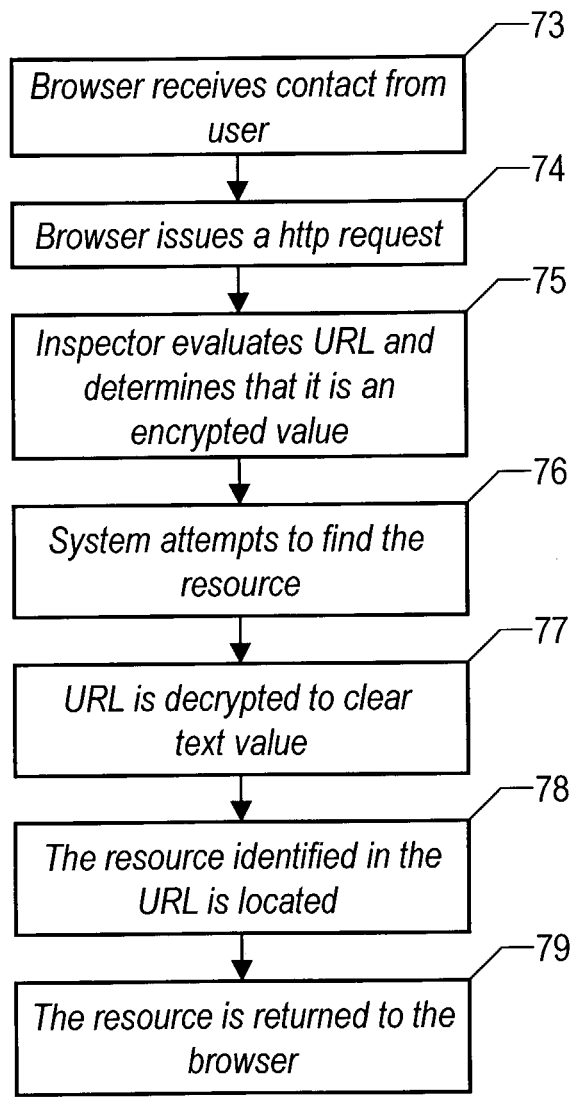
FIG. 5 is a flow diagram of the implement of the present invention when it is necessary to decrypt a URL if the requested URL is encrypted.

FIG. 5 illustrates the situation when it is necessary to decrypt a URL if the requested URL IS encrypted. The URL in this example is: "http://" concatenated with "www.ibm.com/gold/ParseForm/xxx/xxx/xxx/xxx". The 'xxx/xxx/xxx/xxx' represents the encrypted portion of the URL. For the implementation of the present invention in this case, the browser receives a contact from the user in step 73. The URL contained in the user request will not have encrypted information. In step 74, the browser will issue an http request. This request will contain an encrypted URL. For the URL the encryption procedure occurs before the browser issues the http request. The encryption could be a matching procedure wherein each URL received at the browser is matched in a database table to a corresponding encrypted URL. The particular encryption scheme can change periodically for security reasons. As mentioned earlier, the encryption scheme can also incorporate the entire URL or only a portion of the URL. Specific encryption schemes will be examined later in this discussion.

Referring to step 75, the evaluation of the encrypted 'xxx/xxx/xxx/xxx' portion of the URL occurs. In this particular URL, the determination is that the URL has an encrypted value. As a result of this determination, step 76 attempts to find the resource. This attempt can be based on the known or unencrypted part of the URL or on some scheme based on the initial unencrypted URL entered by the user. At the destination server of the URL, step 77 performs a decryption procedure of the encrypted URL and determines a clear-text value, '/gold/ParseForm/username/abc/useremail/abc@123'. After the decryption procedure, step 78 locates the resource '/gold/ParseForm/*' portion of the URL for desired resource. As shown, the encrypted portion of the URL is indicated by the *. However, internally, after the decryption, the location of the actual address is known at the server. In step 79, the requested resource is returned to the browser and requesting user.

Figure 6:
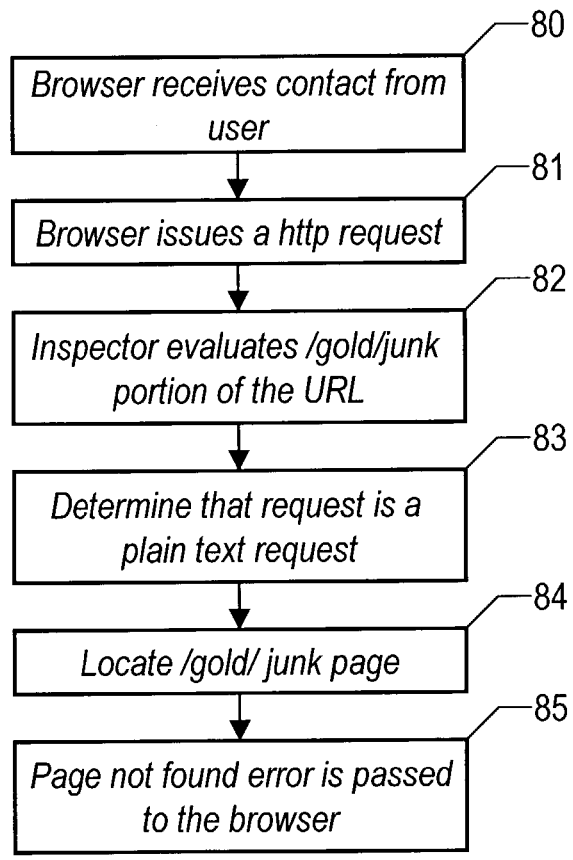
FIG. 6 is a flow diagram of the implement of the present invention when an error condition occurs.

FIG. 6 is an illustration of an error condition in the implementation of the steps in the present invention. In this example the URL is "http://" concatenated with "www.ibm.com/gold/junk". In step 80, the browser receives a contact from a user connected to that browser. The browser issues an http request based on the received URL in step 81. Prior to submitting this http request, the browser could perform an internal check to determine whether this URL has a corresponding encrypted version. If no corresponding encrypted version exists, the http request goes forward as usual. Step 82 evaluates the '/gold/junk' portion of the URL. The evaluation determines that the request is a plain text request step 83. Step 84 attempts to locate this '/gold/junk' page. Since there is a mistake in this URL and no such page exist, the attempt to locate this page will fail. As a result, step 85 sends a page not found error back to the browser originating the URL request.

Figure 7:
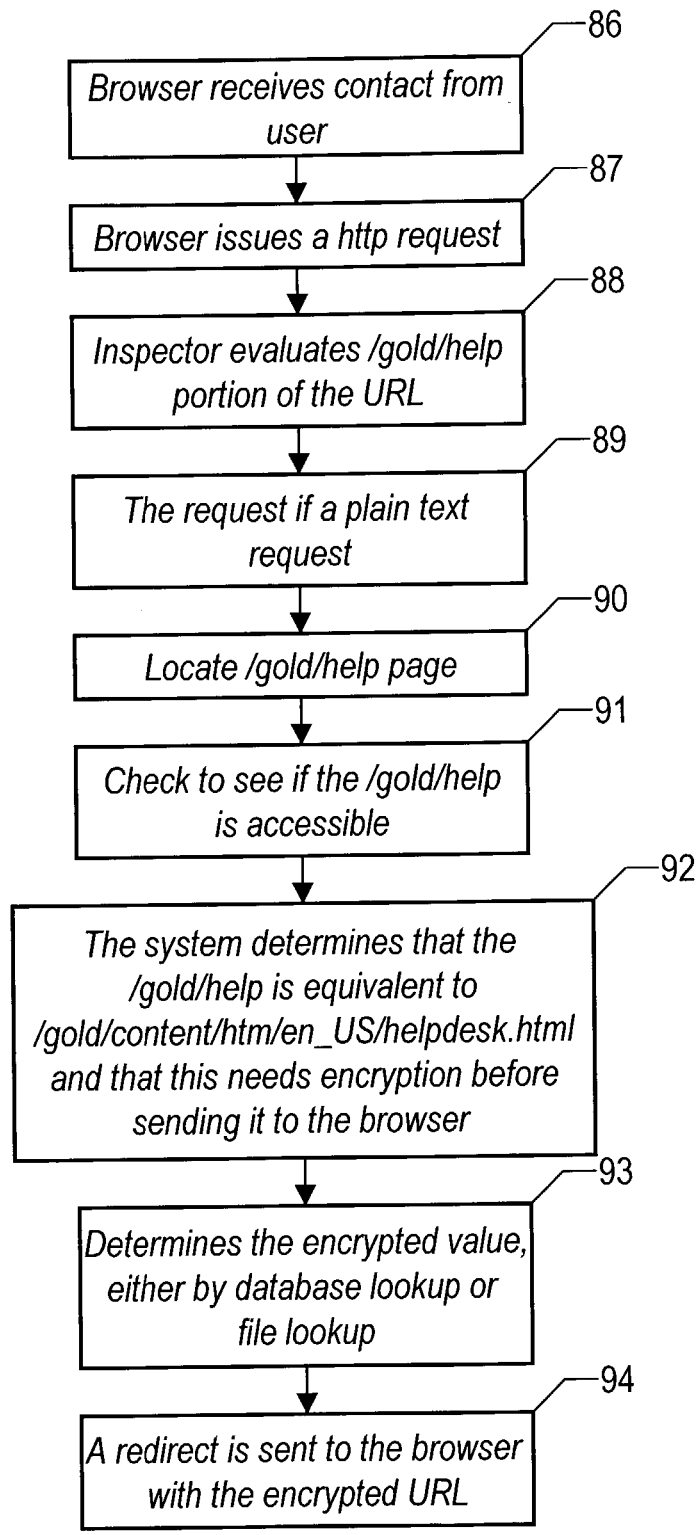
FIG. 7 is a flow diagram of the implement of the present invention in a second situation in which encryption of the URL is necessary.

FIG. 7 illustrates a condition using the help page URL "http://" concatenated with "www.ibm.com/gold/help". Basically, this is a setup in a way that depending on the browser locale, the corresponding locale help page is displayed. This case is also one wherein the URL in the initial request is not encrypted, however, the URL in the response to the initial request is encrypted. The process begins in a manner similar to the process in step 4. In this implementation, in step 86, the user's browser receives an access request from the user. This request contains a URL to a particular web location. For purposes of this example the URL is "http://" concatenated with "www.ibm.com/gold/help". The browser in step 87 issues an http request based on this URL in the user's access request. The evaluation of this URL occurs in step 88. In this evaluation, there is an inspection of the "/gold/help" portion of URL. This portion of the URL is the specific location in the directory. The inspection of the URL resulted in a determined that the request was a plain text request, step 89. After a determination that the request was a plain text request, step 90 locates the '/gold/help' page. Once the page is located, step 91 determines whether the page is accessible. If the page is accessible, there is a determination whether this page should be returned to browser in an encrypted form, step 92. At this point, the determination is that the URL portion '/gold/help' is equivaent to '/gold/content/html/en_US/help-desk.html. As a result of this determine, this URL needs to be encrypted before sending it to the requesting browser. Step 93 can determine the encrypted values for the URL based on lookup schemes such a database lookup or file lookup scheme. In step 94, a redirect (define) is then sent to the browser with the encrypted URL.

Figure 8:
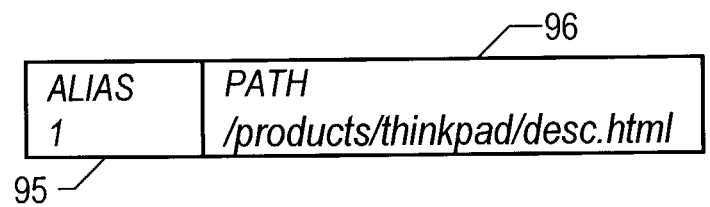
FIG. 8 is an example of a database record for an encryption format using database lookup method of encryption and decryption.

In the present invention, the actual encryption procedure can be performed using conventional encryption schemes. These schemes can range from basic lookup tables to complex public key/private key encryption schemes. For example, there is the URL "http://" concatenated with "www.ibm.com/sbc/products/thinkpad/desc.html" and it is desired to encrypt the '/products/thinkpad/desc.html portion of the URL. The simplest way to encrypt this portion would be to increment each character according to the encryption scheme a=b, b=c, etc. As the result of this encryption scheme the resulting encrypted URL would be 30 "http://" concatenated with "www.ibm.com/sbc/qspevdut/uijolqbe/eft-d.html". Referring to FIG. 8, for more complex web-sites, where several html contents are created through some content management tools, the encryption scheme can be a database lookup. As shown in FIG. 8, the database lookup for the above-illustrated URL has an alias field 95 and a path field 96. The resulting URL transmitted over the network would be "http://" concatenated with "www.ibm.com/sbc/1". Other matching lookup could follow a similar format and structure.

It is important to note that while the present invention has been described in the context of a fully functioning data processing system, those skilled in the art will appreciate that the processes of the present invention are capable of being distributed in the form of instructions in a computer readable hardware storage device such as EPROM, ROM, tape, paper, floppy disc, hard disk drive, RAM, and CD-ROMs.

The invention claimed is:

1. A method for restricting access to information transmitted over a computing network, said method comprising the steps of:
   receiving, by a computer at a network location, a resource request for a resource to be located, said resource request containing a universal resource locator (URL);
   evaluating, by the computer, the URL to determine whether encryption of none, part, or all of the URL is required;
   determining by the computer, whether the requested resource is available;
   locating, by the computer, the requested resource contained in the resource request, when the determination is that the requested resource is available;
   encrypting, the computer, the URL contained in the resource request; and
   determining, by the computer, whether encryption is required for none, part, or all of a return URL of the requested resource that is to be returned to a location of the resource request.

2. The method as described in claim 1 further, said method comprising after a determination that the requested resource is available, the steps of:
   determining, by the computer, whether encryption of the requested resource is required;
   when encryption of the requested resource is required, determining, by the computer, whether the URL of the requested resource is required; and
   determining, by the computer, the encrypted value of the requested resource.

3. The method as described in claim 2, said method further comprising the steps of:
   encrypting the computer, the return URL; and
   sending, by the computer, the encrypted URL to the location of the resource request.

4. A method for restricting access to information transmitted over a computing network, said method comprising the steps of:
   receiving, by a computer at a network location, a resource request for a resource to be located, said request containing a universal resource locator (URL);
   evaluating, by the computer, the URL to determine whether encryption of the URL is required;
   locating, by the computer, the requested resource, when encryption of the URL is not required;
   determining, by the computer, whether the requested resource is available;
   encrypting the computer, the URL contained in the resource request; and
   determining, by the computer, whether encryption of a return URL of the requested resource is required, when the requested resource is available.

5. The method as described in claim 4, wherein an error message is generated when the determination is that the requested resource is unavailable.

6. The method as described in claim 4, said method further comprising after the determination that the return URL requires encryption the steps of:
   determining, by the computer, an encrypted value for the return URL; and
   sending, by the computer, a redirect to a browser originating the resource request using the encrypted value for the return URL.

7. The method as described in claim 4, said method further comprising the step of:
   sending, by the computer, the resource to a browser originating the resource request when encryption of the return URL is not required.

8. A method for restricting access to information transmitted over a computing network, said method comprising the steps of:
   receiving, by a computer, at a network location, a resource request for a resource to be located, said resource request containing a universal resource locator (URL);
   evaluating, by the computer, the URL to determine whether encryption of the URL is required;
   encrypting, by the computer, the URL of the network location of the request;
   transmitting, by the computer, a message containing the encrypted URL to a destination of the requested resource;
   receiving, by the computer, the message at the destination;
   identifying, by the computer, the requested resource based on the information in the encrypted URL;
   decrypting, by the computer, the encrypted URL;
   determining, by the computer, whether the requested resource is available; and
   locating, by the computer, the requested resource.

9. The method as described in claim 8, said method further comprising after said locating step, the step of:
   determining, by the computer, whether encryption of a return URL of the requested resource is required, when the requested resource is available.

10. A computer program product stored in a computer readable hardware storage device for restricting access to information transmitted over a computing network, said computer program product comprising:
    instructions for receiving at a network location a resource request for a resource to be located, said resource request containing a universal resource locator (URL);
    instructions for evaluating the URL to determine whether encryption of none, part, or all of the URL is required;
    instructions for locating the requested resource contained in the resource request;

instructions for encrypting the URL contained in the resource request;
instructions for determining whether the requested resource is available; and
instructions for determining whether encryption of none, part, or all of a return URL of the requested resource that is to be returned to a location of the resource request.

11. The computer program product as described in claim 10, further comprising:
instructions for determining whether encryption of the requested resource is required in response to a determination that the requested resource is available;
instructions for determining whether the URL of the requested resource is required when encryption of the requested resource is required; and
instructions for determining an encrypted value of the requested resource.

12. The computer program product as described in claim 10, further comprising:
instructions for encrypting a return URL;
instructions for sending the encrypted URL to the location of the resource request.

13. A computer program product stored in a computer readable hardware storage device for restricting access to information transmitted over a computing network, said computer program product comprising:
instructions for receiving at a network location a resource request for a resource to be located, said resource request containing a universal resource locator (URL);
instructions for evaluating the URL to determine whether encryption of the URL is required;
instructions for locating the requested resource contained in the resource request, when encryption of the URL is not required;
instructions for determining whether the requested resource is available; and
instructions for determining whether encryption of a return URL of the requested resource is required, when the requested resource is available.

14. The computer program product as described in claim 13, further comprising
instructions for generating an error message when a determination is made that the requested resource is unavailable.

15. The computer program product as described in claim 13, further comprising:
instructions for determining an encrypted value for the return URL in response to a determination that the return URL requires encryption; and
instructions for sending a redirect to a browser originating the resource request using the encrypted value for the return URL.

16. The computer program product as described in claim 13, further comprising
instructions for sending the resource to a browser originating the resource request when encryption of the return URL is not required.

17. A computer program product stored in a computer readable hardware storage device for restricting access to information transmitted over a computing network, said computer program product comprising:
instructions for receiving at a network location a resource request for a resource to be located, said resource request containing a universal resource locator (URL);
instructions for evaluating the URL to determine whether encryption of the URL is required;
instructions for encrypting a URL of the network location;
instructions for determining whether the requested resource is available; and
instructions for locating the requested resource.

18. The computer program product as described 17, further comprising:
instructions for transmitting a request message containing the encrypted URL to a destination of the requested resource.

19. The computer program product as described in claim 17, further comprising
instructions for determining whether encryption of a return URL of the requested resource is required, when the requested resource is available.

* * * * *